United States Patent
Talbot

[19]

[11] Patent Number: 6,154,145
[45] Date of Patent: Nov. 28, 2000

[54] VEHICLE CLOSURE SYSTEMS

[75] Inventor: Kevin Trevor Talbot, Lichfield, United Kingdom

[73] Assignee: Rover Group Limited, Warwick, United Kingdom

[21] Appl. No.: 09/099,151

[22] Filed: Jun. 18, 1998

[30] Foreign Application Priority Data

Jun. 20, 1997 [GB] United Kingdom .................. 9713052

[51] Int. Cl.$^7$ ...................................................... G06F 7/04
[52] U.S. Cl. ............................... 340/825.31; 340/825.69; 340/825.72
[58] Field of Search .......................... 307/10; 340/825.44, 340/10.4, 10.41, 10.42, 825.31, 10.1, 10.5, 825.69, 825.72

[56] References Cited

U.S. PATENT DOCUMENTS

| 5,568,516 | 10/1996 | Strohallen et al. | 375/259 |
| 5,600,323 | 2/1997 | Boschini | 341/173 |
| 5,723,911 | 3/1998 | Glehr | 307/10.2 |
| 5,974,101 | 10/1999 | Nago | 375/350 |

FOREIGN PATENT DOCUMENTS

| 0 440 974 A1 | 8/1991 | European Pat. Off. . |
| 0 524 424 A1 | 1/1993 | European Pat. Off. . |
| 2 300 022 | 10/1996 | United Kingdom . |
| 92/18732 | 10/1992 | WIPO . |

*Primary Examiner*—Michael Horabik
*Assistant Examiner*—M. Shimizu
*Attorney, Agent, or Firm*—Davis and Bujold

[57] ABSTRACT

A system for effecting closure of one or more vehicle windows 30 comprises a portable transmitter unit 14 and a body control unit 12 which can communicate via an alternating magnetic field produced and detected by a pair of conducting coils 16a, 16b, and via a radio frequency transmitter 24 and receiver 22. On transmission of a R.F. closure request signal from the transmitter unit 14, a confirmation request signal is sent by the body control unit 12 via the magnetic link. The confirmation request signal is repeated during closure of the window. The transmission unit responds to each confirmation request signal by transmitting a R.F. confirmation signal, receipt of which enables raising of the window to be initiated or continued. Closure of the window is only initiated if the transmitter unit 14 is within the relatively short range of the magnetic link, and only continues while it remains within range. This reduces the danger of a person becoming trapped by the closing window without the operator of the transmitter unit realising.

22 Claims, 2 Drawing Sheets

VEHICLE CLOSURE SYSTEMS

FIELD OF THE INVENTION

This invention relates to closure systems and in particular to: a closure system for controlling the operation of driven closures for vehicles, such as electric windows and sunroofs; and to a method of operating such a closure system.

BACKGROUND OF THE INVENTION

It is becoming increasingly common to include security systems on vehicles which enable door locks and engine immobilisation to be operated remotely by a portable transmitter unit. It is also known to provide a 'lazy lock' function as part of such systems in which electrically powered windows and sunroof of the vehicle are closed in response to a signal from the transmitter unit requesting locking of the vehicle. However it is a problem with such systems that, whilst it is desirable for the doors to be lockable from a relatively large distance, operation the lazy lock function from such a distance can be dangerous because of the risk of somebody becoming trapped by the closure whilst out of sight of the person operating the transmitter unit.

In U.S. Pat. No. 5,600,323 a system is disclosed which aims to address the problem of undesirable locking or unlocking of a vehicle at distances which may be out of sight of that vehicle. This system divides the area around the vehicle into zones and enables or disables preselected systems in accordance with the presence or absence of the transmitter unit in an associated zone.

It is a problem with the known closure system that it relies on detecting the level of the transmitted signal in order to determine in which zone the transmitter is being operated. The signal may be susceptible to interference from another source or from its surroundings and give rise to incorrect enablement or disablement of a subsystem as a result of a false determination of signal strength.

SUMMARY OF THE INVENTION

It is an object of this invention to provide: an improved closure system for a vehicle, and a method of operating such an improved closure system.

Accordingly the present invention provides a control system for a vehicle closure comprising control means mounted on the vehicle for controlling movement of the closure, a portable transmitter unit, short range transmission means capable of transmitting signals between the transmitter unit and the control means only over distances less than a predetermined maximum distance, and long range transmission means capable of transmitting signals between the transmitter unit and the control means over distances greater than said predetermined maximum distance, wherein the transmitter unit is operable to transmit a closing signal via the long range transmission means requesting closing of the closure, the control means is arranged, on receipt of the closing signal to transmit a confirmation request signal to the transmitter unit, the transmitter unit is arranged, on receipt of the confirmation request signal to transmit a confirmation signal to the control means, at least one of the confirmation request signal and the confirmation signal being transmitted over the short range transmission means, and the control means is arranged to initiate closing of the closure only on receipt of the confirmation signal.

Preferably the short range transmission means is arranged to transmit signals as oscillating magnetic fields. Such fields have a strength which falls off rapidly with distance, thus enabling the range of the transmission means to be limited accurately.

Preferably the long range transmission means is arranged to transmit signals as electromagnetic radiation, most preferably of radio frequency (R.F.).

Preferably the control means is arranged to transmit to the transmitter unit, during closing of the closure, at least one further confirmation request signal and the transmitter unit is arranged, on receipt of one of said further confirmation request signals to transmit a further confirmation signal to the control means, at least one of the further confirmation request signal and the further confirmation signal being transmitted over the short range transmission means, and the control means is arranged to halt closing of the closure if the confirmation signal is not received within a predetermined period. This ensures that, if a person carrying the transmitter unit walks out of range of the short range transmission means during closing of the closure element, closing will stop.

The invention also provides a method of controlling a control system for a vehicle closure comprising control means mounted on the vehicle for controlling movement of the closure, a portable transmitter unit, short range transmission means capable of transmitting signals between the transmitter unit and the control means only over distances less than a predetermined maximum distance, and long range transmission means capable of transmitting signals between the transmitter unit and the control means over distances greater than said predetermined maximum distance, the method including:

a) transmitting a closing signal via the long range transmission means requesting closing of the closure;

b) transmitting a confirmation request signal on receipt of the closing signal to the transmitter unit;

c) transmitting a confirmation signal on receipt of the confirmation request signal to the control means, at least one of the confirmation request signal and the confirmation signal being transmitted over the short range transmission means, and d) initiating closing of the closure only on receipt of the confirmation signal.

The method may include transmitting the signals as oscillating magnetic fields.

The method may include transmitting all signals from the control means to the transmitter unit using the short range transmission means.

The method may include transmitting all signals from the transmitter unit to the control means using the long range transmission means.

The method may include transmitting to the transmitter unit during closing of the closure at least one further confirmation request signal, and transmitting on receipt by the transmitter unit of said further confirmation request signals a further confirmation signal to the control means, the method also including transmitting at least one of the further confirmation request signal and the further confirmation signal over the short range transmission means and halting closing of the closure if the confirmation signal is not received within a predetermined period.

The method may include transmitting at least one confirmation request signal without halting closing of the closure if no confirmation signal is received in response to a first one of said confirmation signals.

The method may include halting closing of the closure only if no confirmation signal is received in response to any of a predetermined number of said repeat confirmation request signals.

The method may include transmitting a closing halt signal using the transmitter unit and halting closing of the closure on receipt of the closing halt signal.

The method may include transmitting the closing signal on depression of a push-button of the transmitter, and transmitting the closing halt signal on release of said push-button.

The method may include controlling a lock system for the vehicle using the short and long range transmission means.

Preferred embodiments of the present invention will now be described by way of example only with reference to the accompanying drawings in which:

DESCRIPTION OF PREFERRED
EMBODIMENTS OF THE INVENTION

Figure 1:
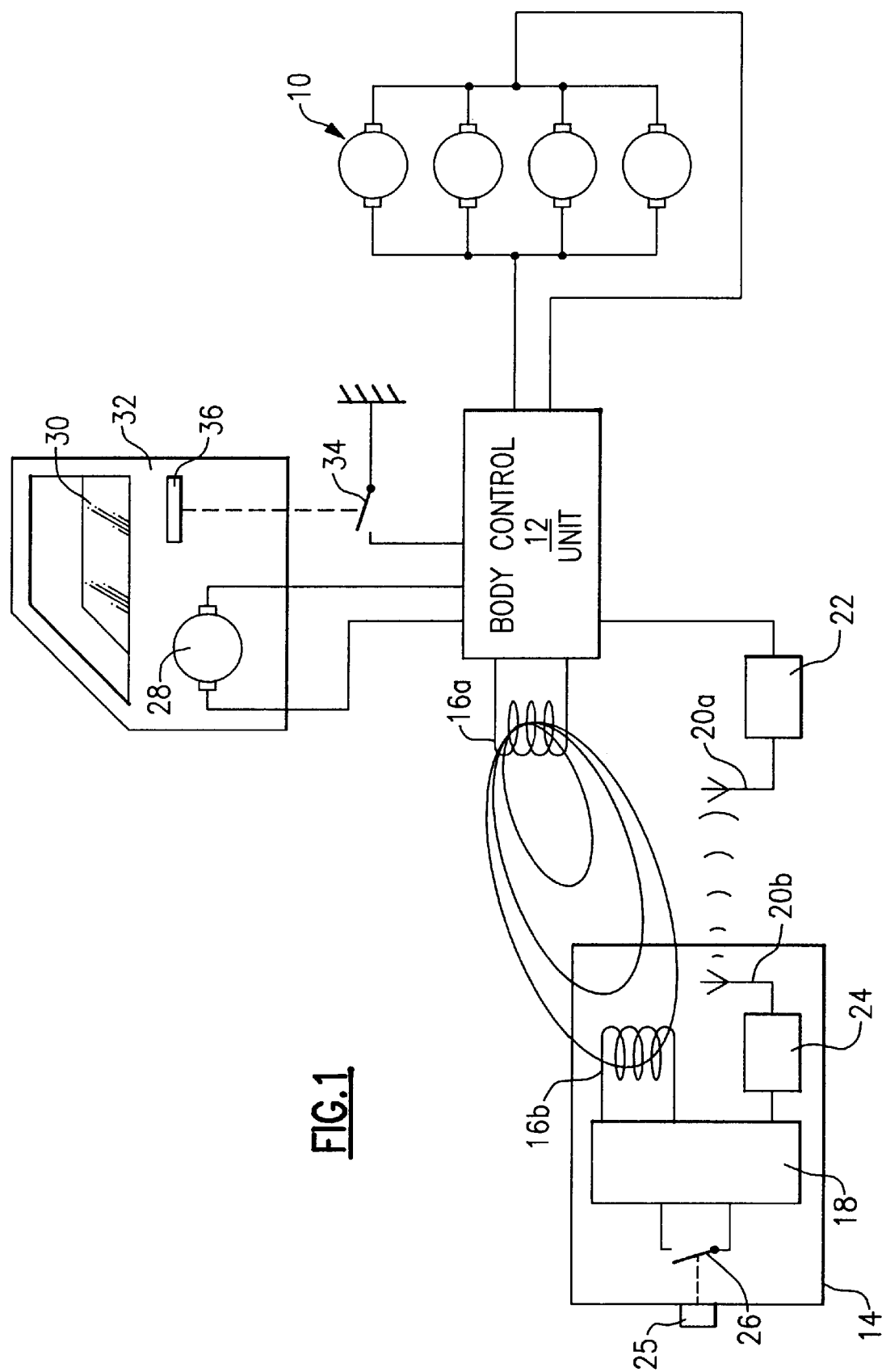
FIG. 1 is schematic diagram of a control system for a vehicle window according to the invention.

Referring to FIG. 1, a vehicle security system comprises four door lock motors 10 which actuate the door locks in each of the vehicle doors under the control of a body control unit 12, and a portable transmitter unit 14. A conducting coil 16a is mounted in the door mirror of the vehicle and connected to the body control unit 12, and another 16b is housed in the transmitter unit 14 and connected to a transmitter control circuit 18. These coils 16a, 16b provide a magnetic link forming a short range transmission means between the transmitter unit 14 and the body control unit 12 and can communicate over distances up to 1.5 m. A radio frequency aerial 20a is mounted on the vehicle and connected to the body control unit 12 via a receiver unit 22, and another 20b is housed in the transmitter unit and connected to the transmitter control circuit 18 via a transmitter unit 24. These aerials 20a, 20b provide a long range transmission means and can communicate over distances up to about 20 m. A push button 25 on the transmitter unit 14 operates a switch 26 which provides a manual input to the transmitter unit control circuit 18.

The body control unit is also connected to window lift motors 28 which raise and lower the windows 30 in each door 32 of the vehicle, and to a sensor switch 34 which senses lifting of the driver's door handle 36.

If the driver approaches the vehicle while the doors 32 are locked and lifts the door handle 36, the body control unit 12 responds by passing an alternating current, of frequency 125 kHz through the coil 16a in the door mirror, which produces an alternating magnetic field. If the driver is carrying the transmitter unit 14, the alternating magnetic field is picked up by the coil 16b in the transmitter unit producing an alternating current in it which can be detected by the transmitter control circuit 18. The alternating magnetic field is produced in a series of pulses so as to form a coded signal which can be recognised by the transmitter control circuit 18. When the transmitter unit 14 receives the coded signal it responds by sending back a coded R.F. unlock signal via the transmitter unit 24 and aerial 20b. When this unlock signal is received by the body control unit 12 via the aerial 20a and receiver unit 22, the body control unit operates the door lock motors 10 to unlock the vehicle. This enables the doors to be unlocked and opened simply by lifting the door handle 36. Because of the short range of the magnetic link the doors will only be unlocked passively if the door handle is lifted by somebody carrying the transmitter unit.

Figure 2:
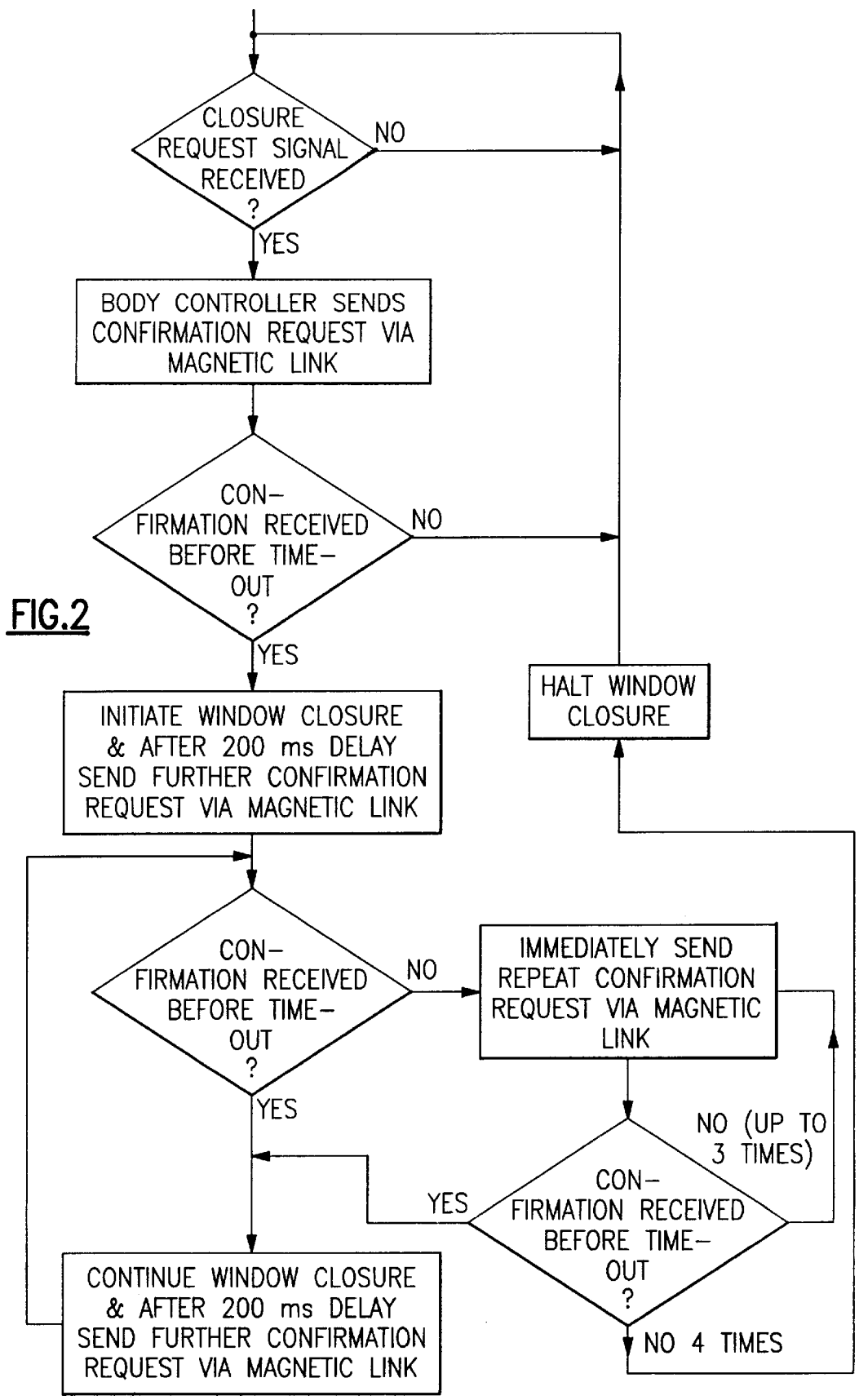
FIG. 2 is a flow diagram showing operation of part of the system of FIG. 1.

The control unit also has a lazy lock function, operation of which will now be described with reference to FIG. 2. If the driver is leaving the vehicle and wants to both lock the doors and close the windows, he depresses the push button 25 closing the switch 26 and holds it down. After it has been held for a period of Is the transmitter unit 16 transmits a coded closure request signal via its R.F. aerial 20b. When the body control unit 12 receives this closure request signal via its aerial 20a it responds by transmitting a coded magnetic confirmation request signal via its coil 16a. If the transmitter unit 14 is within the range of the magnetic link and receives the confirmation request signal, it transmits a coded R.F. confirmation signal. On receipt of this signal, the body control unit 12 initiates closing of the windows 30. If the confirmation signal is not received closing of the windows is not initiated.

Assuming closing of the window has been initiated and the window is being raised, after a delay of 200 ms the body control unit 12 sends out a further coded magnetic confirmation request signal. If this is received by the transmitter unit 14, and the push button 25 is still held down, a further coded R.F. confirmation signal is sent back and, if this is received, the window continues to be raised. This cycle is repeated until the window is fully raised. If, in response to any of the further confirmation request signals, a confirmation signal is not received within a fixed period of 50 ms the body control unit 12 transmits immediately a repeat confirmation request signal. If a confirmation signal is received in response, the window continues to be raised and the system re-enters the 200 ms confirmation loop. If after 3 repeat confirmation request signals a confirmation signal is still not received, for example because the transmitter unit 14 has moved out of range of the magnetic link or because of interference, raising of the window is stopped and the lazy lock function is aborted.

If the operator releases the push button 25 allowing the switch 26 to open the transmitter control circuit 18 detects this and immediately transmits a coded R.F. halt signal. When this is received by the body control unit 12, raising of the window 30 is halted immediately.

It will be seen that the system described will only initiate the lazy lock function if the transmitter unit 14 is within the 1.5 m range of the magnetic link, and will only continue while the transmitter stays within range and the push button 25 is held down by the operator. If the operator initiates lazy locking and then walks out of range whilst still holding the push button 25 down, the windows will be stopped as soon as a confirmation request signal and 3 repeats have been sent out and no confirmation signal received in reply. If at any time during closing of the window the push button 25 is released, raising of the windows will be stopped immediately. Therefore the lazy lock function can only be operated by an operator who is within 1.5 m of the driver's door mirror, who should therefore be aware of any possible dangers of operating the system, and who can abort the function rapidly.

What is claimed is:

1. A control system for a vehicle closure comprising control means mounted on the vehicle for controlling movement of the closure, a portable transmitter unit, short range transmission means capable of transmitting signals between the transmitter unit and the control means only over distances less than a predetermined maximum distance, and long range transmission means capable of transmitting signals between the transmitter unit and the control means over distances greater than said predetermined maximum distance, wherein the transmitter unit is operable to transmit a closing signal via the long range transmission means requesting closing of the closure, the control means is arranged only upon receipt of the closing signal from the long range transmitter to transmit a confirmation request signal to the transmitter unit, the transmitter unit is arranged, upon receipt of the confirmation request signal to transmit a confirmation signal to the control means, at least one of the confirmation request signal and the confirmation signal being transmitted over the short range transmission means, and the control means is arranged to initiate closing of the closure only upon receipt of the confirmation signal from the transmission unit.

2. A system according to claim 1, wherein the short range transmission means is arranged to transmit signals as oscillating magnetic fields.

3. A system according to claim 1, wherein the short range transmission means is arranged to transmit all signals from the control means to the transmitter unit.

4. A system according to claim 1, wherein the long range transmission means is arranged to transmit signals as electromagnetic radiation.

5. A system according to claim 4 wherein the electromagnetic radiation is in the radio frequency range.

6. A system according to claim 1, wherein the long range transmission means is arranged to transmit all signals from the transmitter unit to the control means.

7. A system according to claim 1, wherein the control means is arranged to transmit to the transmitter unit, during closing of the closure, at least one further confirmation request signal and the transmitter unit is arranged, on receipt of one of said further confirmation request signals to transmit a further confirmation signal to the control means, at least one of the further confirmation request signal and the further confirmation signal being transmitted over the short range transmission means, and the control means is arranged to halt closing of the closure if the confirmation signal is not received within a predetermined period.

8. A system according to claim 7, wherein the control means is arranged to transmit at least one repeat confirmation request signal without halting closing of the closure if no confirmation signal is received in response to a first one of said confirmation request signals.

9. A system according to claim 8, wherein the control means is arranged to halt closing of the closure only if no confirmation signal is received in response to any of a predetermined number of said repeat confirmation request signals.

10. A system according to claim 1, wherein the transmitter unit is also operable to transmit a closing halt signal and the control unit is arranged, on receipt of the closing halt signal, to halt closing of the closure.

11. A system according to claim 10, wherein the transmitter unit includes a push-button which can be depressed so as to cause the transmitter unit to transmit the closing signal, and which can be released so as to cause the transmitter unit to transmit the closing halt signal.

12. A system according to claim 1, wherein the short and long range transmission means are further operable to control a lock system for the vehicle.

13. A method of controlling a control system for a vehicle closure comprising control means mounted Upon the vehicle for controlling movement of the closure, a portable transmitter unit, short range transmission means capable of transmitting signals between the transmitter unit and the control means only over distances less than a predetermined maximum distance, and long range transmission means capable of transmitting signals between the transmitter unit and the control means over distances greater than said predetermined maximum distance, the method including:
   a) transmitting a closing signal via the transmitter unit long range transmission means to the body control unit requesting closing of the closure;
   b) transmitting a confirmation request signal from the body control unit upon receipt of the closing signal to the transmitter unit;
   c) transmitting a confirmation signal from the transmitter unit upon receipt of the confirmation request signal to the control means, at least one of the confirmation request signal and the confirmation signal being transmitted over the short range transmission means, and
   d) initiating closing of the closure only on receipt of the confirmation signal.

14. A method according to claim 13, including transmitting the signals as oscillating magnetic fields.

15. A method according to claim 13, including transmitting all signals from the control means to the transmitter unit using the short range transmission means.

16. A method according to claim 13, including transmitting all signals from the transmitter unit to the control means using the long range transmission means.

17. A method according to claim 13, including transmitting to the transmitter unit during closing of the closure at least one further confirmation request signal, and transmitting on receipt by the transmitter unit of said further confirmation request signals a further confirmation signal to the control means, the method also including transmitting at least one of the further confirmation request signal and the further confirmation signal over the short range transmission means and halting closing of the closure if the confirmation signal is not received within a predetermined period.

18. A method according to claim 17, including transmitting at least one confirmation request signal without halting closing of the closure if no confirmation signal is received in response to a first one of said confirmation signals.

19. A method according to claim 18, including halting closing of the closure only if no confirmation signal is received in response to any of a predetermined number of said repeat confirmation request signals.

20. A method according to claim 13, including transmitting a closing halt signal using the transmitter unit and halting closing of the closure on receipt of the closing halt signal.

21. A method according to claim 20, including transmitting the closing signal on depression of a push-button of the transmitter, and transmitting the closing halt signal on release of said push-button.

22. A method according to claim 13, including controlling a lock system for the vehicle using the short and long range transmission means.

* * * * *